(12) United States Patent
Uemura et al.

(10) Patent No.: US 12,146,082 B2
(45) Date of Patent: Nov. 19, 2024

(54) TAPE

(71) Applicant: King Package Co., Ltd., Kawaguchi (JP)

(72) Inventors: Sei Uemura, Kawaguchi (JP); Kohji Yoshida, Kawaguchi (JP)

(73) Assignee: KING PACKAGE CO., LTD., Kawaguchi (JP)

( * ) Notice: Subject to any disclaimer, the term of this patent is extended or adjusted under 35 U.S.C. 154(b) by 290 days.

(21) Appl. No.: 17/622,299

(22) PCT Filed: Apr. 9, 2020

(86) PCT No.: PCT/JP2020/016042
§ 371 (c)(1),
(2) Date: Dec. 23, 2021

(87) PCT Pub. No.: WO2020/261709
PCT Pub. Date: Dec. 30, 2020

(65) Prior Publication Data
US 2022/0348795 A1 Nov. 3, 2022

(30) Foreign Application Priority Data
Jun. 28, 2019 (JP) .................. 2019-121562

(51) Int. Cl.
*C09J 7/29* (2018.01)
(52) U.S. Cl.
CPC ............. *C09J 7/29* (2018.01); *C09J 2301/18* (2020.08); *C09J 2301/204* (2020.08)

(58) Field of Classification Search
CPC ..... C09J 7/29; C09J 2301/18; C09J 2301/204
See application file for complete search history.

(56) References Cited

U.S. PATENT DOCUMENTS

| 2007/0172620 A1* | 7/2007 | Rodewald | ................. C09J 7/22 |
| | | | 428/40.1 |
| 2007/0184242 A1* | 8/2007 | Rodewald | ................. B32B 7/12 |
| | | | 428/354 |
| 2008/0173389 A1* | 7/2008 | Mehta | ................. C09J 7/22 |
| | | | 428/40.1 |

(Continued)

FOREIGN PATENT DOCUMENTS

| DE | 4036985 A * | 5/1992 | ........... B65D 5/0236 |
| EP | 4059709 A1 | 9/2022 | |

(Continued)

OTHER PUBLICATIONS

Espacenet Translation of DE-4036985-A (Year: 2023).*

(Continued)

*Primary Examiner* — Michael Zhang
(74) *Attorney, Agent, or Firm* — Panitch Schwarze Belisario & Nadel LLP (57) ABSTRACT

A tape is provided having a long shape in which a bond portion is formed on at least one surface. The tape includes a first slit row including a plurality of slits formed intermittently along a longitudinal direction, and a second slit row including a plurality of slits formed intermittently along a longitudinal direction and parallel to the first slit row. A portion without having a slit formed in the first slit row is arranged so as not to overlap a portion without having a slit formed in the second slit row.

6 Claims, 4 Drawing Sheets

(56) References Cited

U.S. PATENT DOCUMENTS

| | | | |
|---|---|---|---|
| 2009/0038754 A1* | 2/2009 | Rodewald | C09J 7/22 |
| | | | 156/60 |
| 2014/0203018 A1 | 7/2014 | Kerep | |
| 2023/0010195 A1* | 1/2023 | Uemura | C09J 7/203 |

FOREIGN PATENT DOCUMENTS

| | | |
|---|---|---|
| JP | 2001-354923 A | 12/2001 |
| JP | 2005-513194 A | 5/2005 |
| JP | 2008-189865 A | 8/2008 |
| JP | 2009-030057 A | 2/2009 |
| JP | 43-25679 B2 | 9/2009 |
| JP | 2014-532090 A | 12/2014 |
| WO | 03/052018 A1 | 6/2003 |

OTHER PUBLICATIONS

Int'l Search Report issued Jun. 30, 2020 in Int'l Application No. PCT/JP2020/016042.
Search Report issued May 30, 2023 in EP Application No. 20831436.9.

* cited by examiner

TAPE

CROSS-REFERENCE TO RELATED APPLICATIONS

This application is a Section 371 of International Application No. PCT/JP2020/016042, filed Apr. 9, 2020, which was published in the Japanese language on Dec. 30, 2020 under International Publication No. WO 2020/261709 A1, which claims priority under 35 U.S.C. § 119(b) to Japanese Application No. 2019-121562, filed on Jun. 28, 2019, the disclosures of which are incorporated herein by reference in their entireties.

The present invention relates to a tape.

The present application claims priority based on Japanese Patent Application No. 2019-121562 filed in Japan on Jun. 28, 2019, the contents of which are incorporated herein by reference.

BACKGROUND ART

Patent Document 1 discloses a reinforcement tape including a transparent backing layer. Such a reinforcement tape is generally bonded to an article by a bonding layer provided on one surface.

PRIOR ART

Patent Document

[Patent Document 1] Published Japanese Translation No. 2005-513194 of the PCT International Publication

DISCLOSURE OF INVENTION

Problems to be Solved by the Invention

The tapes as described above may be used in a state where a tensile load is applied in the longitudinal direction. In such a state, if a notch is generated at the edge portion in the lateral direction due to an influence such as strength reduction or friction, the notch may be extended in the lateral direction due to the tensile load being applied in the longitudinal direction, and there is a possibility that the tape is cut.

The present invention has been made in view of the above-described issues, and an object thereof is to provide a tape that is not easily cut even if a notch is formed at an edge portion.

Means for Solving the Problems (1) A tape according to one aspect of the present invention has a long shape in which a bond portion is formed on at least one surface, the tape includes a first slit row including a plurality of slits formed intermittently along a longitudinal direction, and a second slit row including a plurality of slits formed intermittently along a longitudinal direction and parallel to the first slit row, in which a portion without having a slit formed in the first slit row is arranged so as not to overlap a portion without having a slit formed in the second slit row.

(2) The tape of the above-described (1) may include a base portion having a long-shape, and a reinforcement portion having a long shape, including the first slit row and the second slit row, and being adhered to the base portion.

(3) In the tape of the above-described (2), the base portion may include a first surface which is an adhesive surface and a second surface which is a non-adhesive surface, the reinforcement portion may include a first surface and a second surface which are both non-adhesive surfaces, and one of the first surface and the second surface of the reinforcement portion may be adhered to the first surface of the base portion.

(4) The tape of the above-described (3) may include a plurality of the reinforcement portions intermittently provided along the longitudinal direction of the base portion.

(5) In the tapes of the above-described (1) to (4), the bond portion may be formed only on a portion of at least one surface of the tape.

Effects of the Invention

According to one or more aspects of the present invention, it is possible to prevent the tape from being cut because a notch formed in the edge portion (side edge) in the lateral direction continues to extend along the lateral direction.

BEST MODE FOR CARRYING OUT THE INVENTION

Hereinafter, a tape according to the embodiments of the present invention will be described with reference to the drawings.

First Embodiment

Figure 1A:
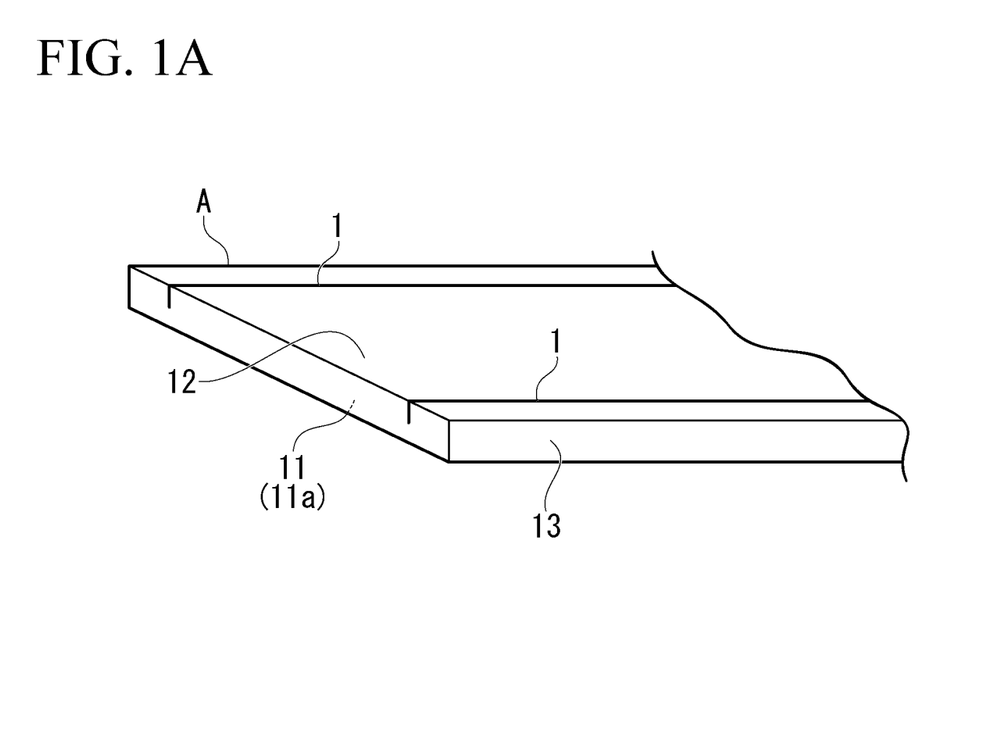
FIG. 1A is a perspective view which shows the tape according to the first embodiment.
Figure 1B:
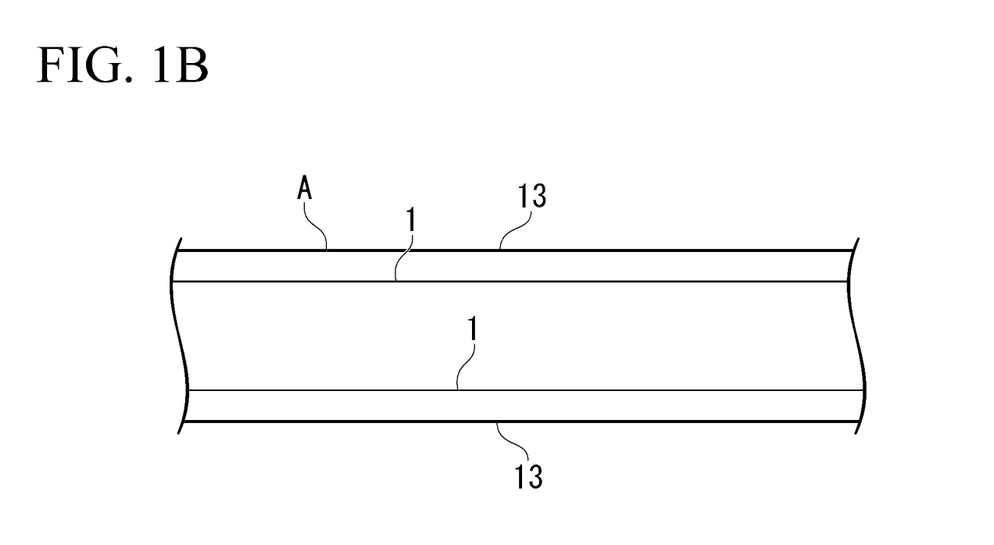
FIG. 1B is a plan view which shows the tape according to the first embodiment.

A tape A according to the present embodiment is an adhesive tape having a long shape and including a first surface 11 which is an adhesive surface and a second surface 12 which is a non-adhesive surface. A bond portion 11a is formed on the first surface 11 of the tape A. In the following, the bond portion is a portion to which the tape is directly bonded to an object to which the tape is attached. As shown in FIGS. 1A and 1B, two half slits (strength reduction portions) 1 are formed on the second surface 12 of the tape A along the longitudinal direction of the tape A. The two half slits 1 are each separated from both side edges 13 of the tape A by a certain distance. As an example, the distance between the side edge 13 and the adjacent slit 1 is approximately 3 mm.

The two half slits 1 are formed so as to be parallel to each other. In addition, as shown in FIG. 1A, the half slit 1 is a groove reaching from the second surface 12 to a certain depth, and does not penetrate to the first surface 11. As an example, the groove depth of the half slit 1 is approximately 50 μm.

In the tape A to which a tensile load is applied in the longitudinal direction, when a cut occurs in the edge portion (side edge 13), the cut is extended in the lateral direction. In the half slit 1, the tear strength of the tape A is relatively low in the longitudinal direction. Therefore, the cut that reaches from the side edge 13 to the half slit 1 is extended in the longitudinal direction along the half slit 1. As described above, based on the tape A according to the present embodiment, the half slit 1 can prevent the cut formed at the side edge 13 from continuing to extend along the lateral direction. As a result, the tape A can be prevented from being cut.

In addition, such a tape A can be prevented from being cut by a simple structure, and can be manufactured at low cost without using an expensive filament or the like.

Second Embodiment

A tape B according to the second embodiment, which is a modification example of the first embodiment described above, will be described with reference to FIGS. 2A and 2B.

Figure 2A:
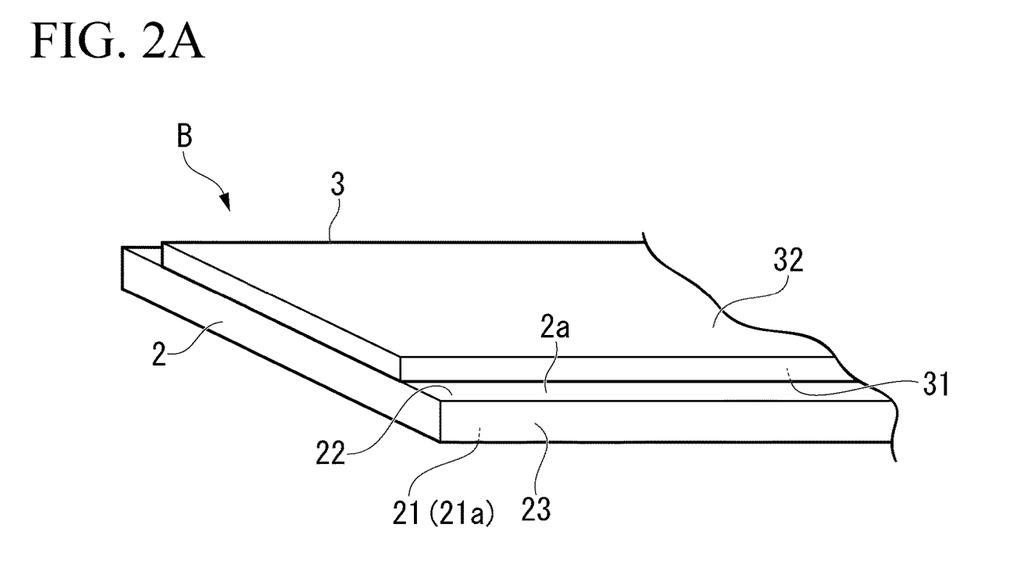
FIG. 2A is a perspective view which shows the tape according to the second embodiment.

The tape B according to the present embodiment is an adhesive tape having a long shape in which one surface is an adhesive surface and the other surface is a non-adhesive surface as a whole. As shown in FIG. 2A, the tape B includes a base portion 2 and a reinforcement portion 3. The base portion 2 is a tape having a long shape and including a first surface 21 which is an adhesive surface and a second surface 22 which is a non-adhesive surface. A bond portion 21a is formed on the first surface 21 of the tape B.

The reinforcement portion 3 is a tape having a long shape and including a first surface 31 which is an adhesive surface and a second surface 32 which is a non-adhesive surface. The width of the reinforcement portion 3 in the lateral direction is smaller than the width of the base portion 2 in the lateral direction. As an example, the difference thereof is approximately 6 mm. The reinforcement portion 3 is attached to a center portion of the second surface 22 of the base portion 2. That is, the reinforcement portion 3 is arranged on an inner side than the both side edges 23 of the base portion 2.

Figure 2B:
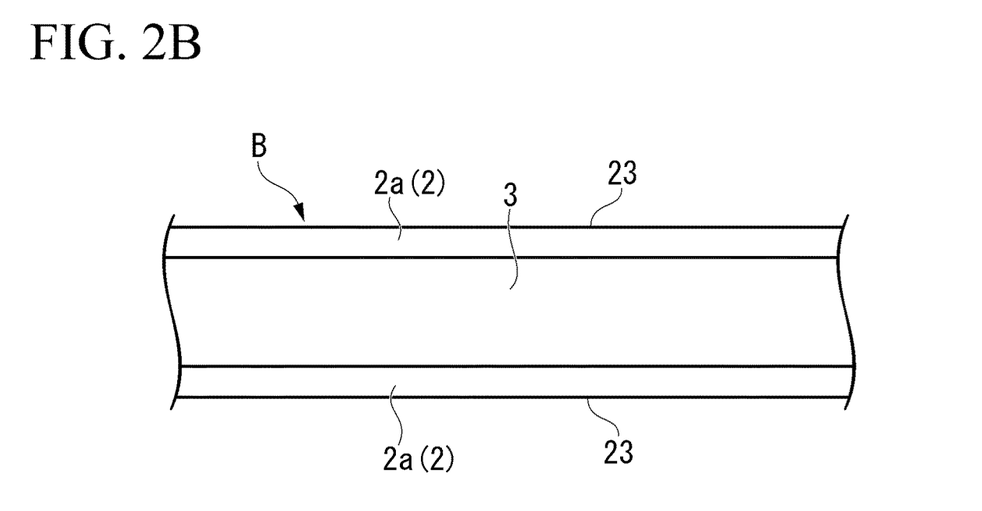
FIG. 2B is a plan view which shows the tape according to the second embodiment.

As shown in FIG. 2B, the second surface 22 of the base portion 2 is exposed at both ends of the reinforcement portion 3 in the lateral direction. That is, the portion 2a which is exposed of the base portion 2 (hereinafter referred to as the exposed portion 2a) is a portion where the strength is relatively low in the entire tape B without being reinforced by the reinforcement portion 3, and is a strength reduction portion in the present embodiment.

In the tape B according to the present embodiment, the exposed portion 2a includes a lower tear strength as a whole than a portion to which the reinforcement portion 3 is attached. In the tape B to which a tensile load is applied in the longitudinal direction, when a cut occurs in the exposed portion 2a (side edge 23), the cut is extended in the lateral direction. The cut that reaches the portion where the reinforcement portion 3 is attached is extended in a direction of lower tear strength, that is, along a boundary between the portion where the reinforcement portion 3 is attached and the exposed portion 2a. As described above, based on the tape B according to the present embodiment, the exposed portion 2a can prevent a tear from continuing to extend along the lateral direction. As a result, the tape B can be prevented from being cut.

In addition, the tape B according to the present embodiment can be formed by adhering the base portion 2 and the reinforcement portion 3 together, and it is not necessary to form a notch in the tape B itself. That is, when manufacturing the tape B, it is not necessary to process a surface of the tape, and the tape B can be easily manufactured.

Third Embodiment

A tape C according to the third embodiment, which is a modification example of the first embodiment described above, will be described with reference to FIGS. 3A and 3B.

Figure 3A:
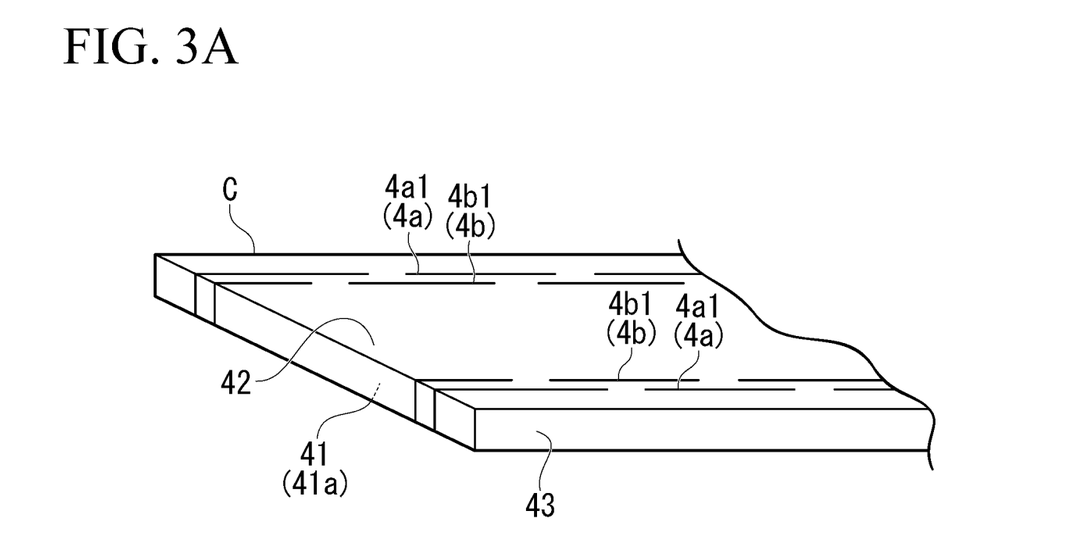
FIG. 3A is a perspective view which shows the tape according to the third embodiment.

The tape C according to the present embodiment is an adhesive tape having a long shape and including a first surface 41 which is an adhesive surface and a second surface 42 which is a non-adhesive surface. An adhesive portion 41a is formed on the first surface 41 of the tape C. As shown in FIG. 3A, a slit row (first slit row) 4a and a slit row (second slit row) 4b are formed on the second surface 42 of the tape C.

The slit row 4a includes a plurality of slits 4a1 formed intermittently along the longitudinal direction of the tape C. Between the adjacent slits 4a1 and 4a1, there is a portion (non-slit portion) 4a2 in which the slit is not formed. The slit row 4b includes a plurality of slits 4b1 formed intermittently along the longitudinal direction of the tape C, and is parallel to the slit row 4a. Between the adjacent slits 4b1 and 4b1, there is a portion (non-slit portion) 4b2 in which a slit is not formed.

Figure 3B:
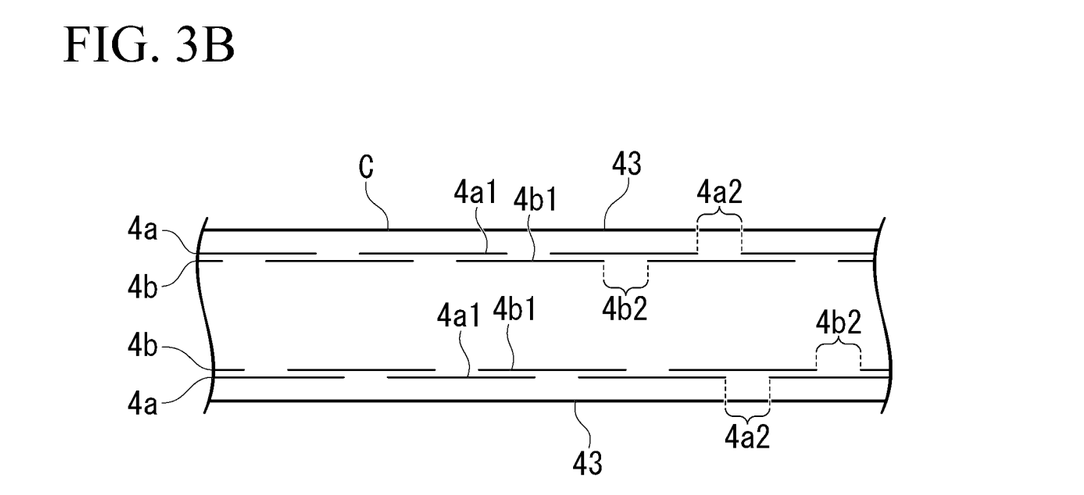
FIG. 3B is a plan view which shows the tape according to the third embodiment.

FIGS. 3A and 3B show an example of a tape C provided with two slit rows 4a and two slit rows 4b. The two slit rows 4a are each separated from both side edges 43 of the tape C by a certain distance. In addition, the two slit rows 4b are provided on an inner side than the slit rows 4a. As an example, the distance between the side edge 43 and the adjacent slit row 4a is approximately 2 mm, and the distance between the side edge 43 and the adjacent slit row 4b is approximately 3 mm.

The slit row 4a forms a broken line in which the slits 4a1 and the non-slit portions 4a2 are alternately arranged along the longitudinal direction in the plan view of the tape C. Similarly, the slit row 4b forms a broken line in which the slit 4b1 and the non-slit portion 4b2 are alternately arranged along the longitudinal direction in the plan view of the tape C.

In addition, the non-slit portion 4a2 of the slit row 4a is arranged so as not to overlap with the non-slit portion 4b2 of the adjacent slit row 4b. In the examples of FIGS. 3A and 3B, with respect to the slit rows 4a and 4b adjacent to each other, the slits 4a1 of the slit rows 4a and the slits 4b1 of the slit rows 4b are arranged so as to shift each other by a half-phase, and the slits 4a1 and 4b1 are formed in a staggered manner as a whole.

That is, at least one of the slits 4a1 and the slits 4b1 is formed in the vicinity of both side edges 43 at any position in the longitudinal direction of the tape C. The slits 4a1 and 4b1 penetrate from the second surface (non-adhesive surface) 42 to the first surface (adhesive surface) 41 of the tape C. The portion where the slit row 4a and the slit row 4b are formed is a strength reduction portion in the present embodiment.

In the tape C to which a tensile load is applied in the longitudinal direction, when a cut occurs in the side edge 13 of the tape C, the cut is extended in the lateral direction. In the slit rows 4a and 4b, the tear strength of the tape C is relatively low in the longitudinal direction. Therefore, the cut that reaches the slit 4a or the slit 4b from the side edge 43 is extended in the longitudinal direction along the slit 4a or the slit 4b. As described above, based on the tape C according to the present embodiment, it is possible to prevent the cut formed at the side edge 43 from continuing to extend along the lateral side. As a result, the tape C can be prevented from being cut.

In addition, in the tape C according to the present embodiment, respective slits 4a1 and 4b1 penetrate from the second surface (non-adhesive surface) 42 to the first surface (adhesive surface) 41. Therefore, when manufacturing the tape C, high processing accuracy in the thickness direction of the tape is not required, and the tape C can be easily manufactured.

In addition, the non-slit portion 4a2 of the slit 4a and the non-slit portion 4b2 of the slit 4b are arranged in a staggered manner That is, a slit 4a1 or a slit 4b1 is formed in the vicinity of both side edges 43 at any position in the longitudinal direction of the tape C. Therefore, it is possible to prevent the tape C from being cut at any position in the longitudinal direction of the tape C.

Fourth Embodiment

The tape D according to the fourth embodiment, which is a modification example of the third embodiment, will be described with reference to FIGS. 4A and 4B. The same components as those of the tape C have the same reference numerals, and the description thereof will be omitted.

The tape D according to the present embodiment is a tape having a long shape. As shown in FIG. 4A, the tape D includes a base portion 2 and a reinforcement portion 5.

The base portion 2 in the present embodiment is an adhesive tape having a long shape and including a first surface 21 which is an adhesive surface and a second surface 22 which is a non-adhesive surface. A bond portion 21a is formed on the first surface 21 of the base portion 2. The reinforcement portion 5 includes a first surface 51 and a second surface 52, both of which are non-adhesive surfaces. Similar to the tape C, the reinforcement portion 5 is formed with slit rows 5a and 5b.

The slit row (first slit row) 5a includes a plurality of slits 5a1 formed intermittently along the longitudinal direction of the tape C. Between the adjacent slits 5a1 and 5a1, there is a portion (non-slit portion) 5a2 in which no slit is formed. The slit row (second slit row) 5b includes a plurality of slits 5b1 formed intermittently along the longitudinal direction of the tape C, and is parallel to the slit row 5a. Between the adjacent slits 5b1 and 5b1, there is a portion (non-slit portion) 5b2 in which no slit is formed.

Each of the slits 5a1 and 5b1 penetrates from the second surface (non-adhesive surface) 52 to the first surface (adhesive surface) 51 of the tape D.

Figure 4A:
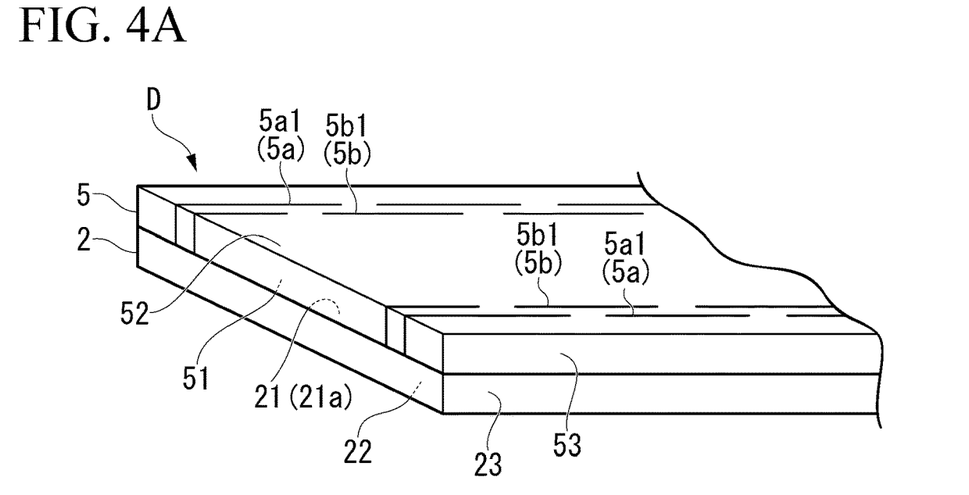
FIG. 4A is a perspective view which shows the tape according to the fourth embodiment.
Figure 4B:
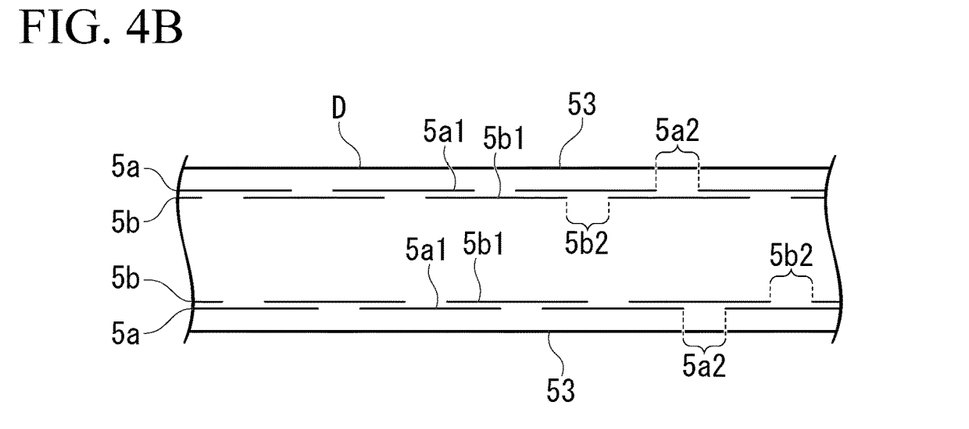
FIG. 4B is a plan view which shows the tape according to the fourth embodiment.

FIGS. 4A and 4B show an example of a tape D provided with two slit rows 5a and two slit rows 5b. In such an example, with respect to the slit rows 5a and 5b adjacent to each other, the slits 5a1 of the slit rows 5a and the slits 5b1 of the slit rows 5b are arranged so as to shift each other by a half-phase, and the slits 5a1 and 5b1 are formed in a staggered manner as a whole. The slit rows 5a and 5b are portions where the strength is relatively low in the reinforcement portion 5, and are strength reduction portions in the present embodiment.

Figure 4C:
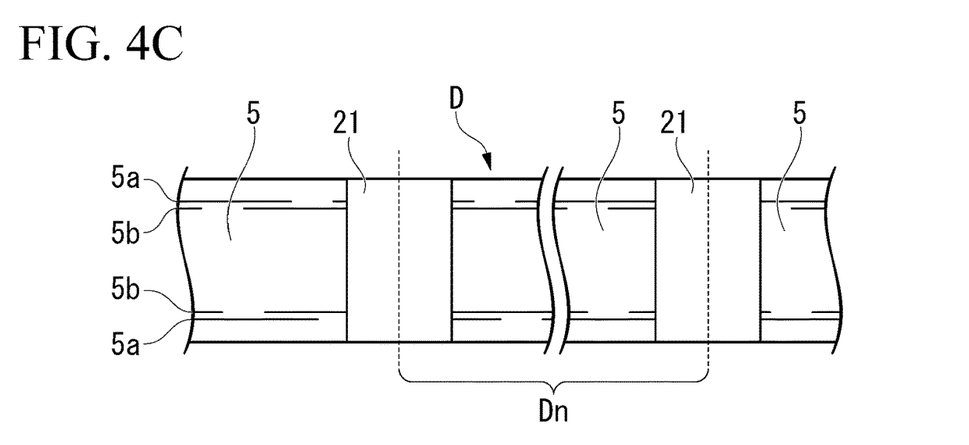
FIG. 4C is a plan view which shows the tape according to the fourth embodiment.

As shown in FIG. 4C, a plurality of reinforcement portions 5 may be provided intermittently along the longitudinal direction on the first surface (adhesive surface) 21 of the base portion 2. In this case, it is possible to provide the tape D in which a portion of the first surface (adhesive surface) 21 of the base portion 2 is exposed. By cutting out a portion of such a tape D, it is possible to obtain a tape piece Dn having adhesiveness at both ends (that is, the bond portions are exposed at both ends) and the other portions are reinforced by the reinforcement portion 5.

The tape D illustrated in FIGS. 4A to 4C is formed by adhering a reinforcement portion 5 having substantially the same width to the first surface (adhesive surface) 21 of the base portion 2.

In the tape D to which a tensile load is applied in the longitudinal direction, when a cut occurs in the side edge 53 of the tape D, the cut is extended in the lateral direction. In the slit rows 5a and 5b, the tear strength of the tape D is relatively low in the longitudinal direction. Therefore, the cut that reaches the slit 5a or the slit 5b from the side edge 53 is extended in the longitudinal direction along the slit 5a or the slit 5b. As described above, based on the tape D according to the present embodiment, it is possible to prevent the cut formed at the side edge 53 from continuing to extend along the lateral side. As a result, the tape D can be prevented from being cut.

In addition, in the tape D according to the present embodiment, slits 5a and 5b are formed in the reinforcement portion 5 including no adhesive surface. When each slit is formed by using a surface-processing cutter when manufacturing the tape D, the cutter does not come into contact with the adhesive surface. Therefore, the tape D can be easily manufactured without deteriorating the accuracy of forming each slit by the cutter.

Although preferred embodiments of the present invention have been described above with reference to the drawings, the present invention is not limited to the above-described embodiments. The various shapes and combinations of the constituent members shown in the above-described embodiment are examples, and can be variously changed based on design requirements and the like without departing from the spirit of the present invention.

In the tape according to each of the above embodiments, the bond portion on the adhesive surface can be formed by an adhesive. The bond portion may be formed by a heat sealant. In addition, any material that exhibits an adhesive or bonding function can be used for the adhesive portion.

As the third embodiment and the fourth embodiment described above, a tape including four slit rows has been illustrated; however, the present invention is not limited thereto. For example, a configuration including a total of two slit rows, one in the vicinity of each side edge, may be employed.

As a modification example of the second embodiment, there is also a tape having the same width as the base portion 2 and employing the reinforcement portion 3 including the above-described half slit 1 formed on the second surface 32.

In the tape according to each of the above-described embodiments, the bond portion may be formed on the entire surface of the adhesive surface, or may be formed only on a portion of the adhesive surface. Regarding the tape according to each of the above-described embodiments, a tape piece cut out so that both ends have adhesiveness (that is, the adhesive portion is exposed at both ends) can be used as a handle by attaching both ends to an article.

As a specific example, the tape piece Dn illustrated in FIG. 4C can be described. In the tape D illustrated in FIG. 4C, when viewed as a whole, a bond portion having adhesiveness to the article is formed on a portion of the adhesive surface (that is, a region where the reinforcement portion 5 is not formed).

Since such a tape piece includes any of the strength reduction portions described above, cutting in the lateral direction can be prevented.

In each of the above embodiments, the strength reduction portions are formed parallel to the longitudinal direction; however, the present invention is not limited thereto. For example, the strength reduction portion may be formed along a direction slightly inclined from the longitudinal direction.

In addition, in each of the above embodiments, the strength reduction portion is provided in the vicinity of both side edges of the tape; however, the present invention is not limited thereto. For example, the strength reduction portion may be formed in the center of the tape.

INDUSTRIAL APPLICABILITY

According to one or more aspects of the present invention, it is possible to provide a tape capable of preventing a notch formed in the edge of the tape in the lateral direction from continuously extending along the lateral direction and being cut.

DESCRIPTION OF THE REFERENCE SYMBOLS

A to D Tape
1 Half slit
2 Base portion
3 Reinforcement portion
4a, 4b Slit row
5 Reinforcement portion
5a, 5b Slit row

The invention claimed is:

1. A tape having a long shape in which a bond portion is formed on at least one surface, the tape comprising:
   a base portion having a long shape; and
   a reinforcement portion having a long shape being adhered to the base portion, the reinforcement portion comprising:
      a first surface,
      a second surface,
      a first side edge in a lateral direction of the tape,
      a second side edge positioned opposite the first side edge in the lateral direction,
      a first strength reduction portion formed near the first side edge, and
      a second strength reduction portion formed near the second side edge,
      wherein:
         the first strength reduction portion includes only a first slit row and a second slit row positioned between the first slit row and a center line in the lateral direction, the center line extending in a longitudinal direction of the tape and passing through a center of the tape in the lateral direction,
         the first slit row comprises a plurality of slits formed intermittently along the longitudinal direction,
         the second slit row comprises a plurality of slits formed intermittently along the longitudinal direction and parallel to the first slit row,
         a portion without a slit formed in the first slit row does not overlap a portion without a slit formed in the second slit row, and wherein:
      the second strength reduction portions includes only a third slit row and a fourth slit row positioned between the third slit row and the center line in the lateral direction,
      the third slit row comprises a plurality of slits formed intermittently along the longitudinal direction,
      the fourth slit row comprises a plurality of slits formed intermittently along the longitudinal direction and parallel to the third slit row, and
      a portion without a slit formed in the third slit row does not overlap a portion without a slit formed in the fourth slit row.

2. The tape according to claim 1, wherein the bond portion is formed only on a portion of at least one surface of the tape.

3. The tape according to claim 1,
   wherein, in the lateral direction, a distance between the first slit row and the second slit row is shorter than a distance between the second slit row and the fourth slit row, and
   wherein, in the lateral direction, a distance between the third slit row and the fourth slit row is shorter than a distance between the second slit row and the fourth slit row.

4. The tape according to claim 1,
   wherein, in the lateral direction, a distance between the first side edge and the first slit row is longer than a distance between the first slit row and the second slit row, and
   wherein, in the lateral direction, a distance between the second side edge and the third slit row is longer than a distance between the third slit row and the fourth slit row.

5. A tape having a long shape in which a bond portion is formed on at least one surface, the tape comprising:
   a base portion having a long shape, the base portion comprising a first surface which is an adhesive surface and a second surface which is a non-adhesive surface; and
   a reinforcement portion having a long shape, the reinforcement portion comprising:
      a first surface,
      a second surface, one of the first surface and the second surface of the reinforcement portion being adhered to the first surface of the base portion
      a first side edge in a lateral direction of the tape,
      a second side edge positioned opposite the first side edge in the lateral direction,
      a first strength reduction portion formed near the first side edge, and
      a second strength reduction portion formed near the second side edge,
      wherein:
         the first strength reduction portion includes only a first slit row and a second slit row positioned between the first slit row and a center line in the lateral direction, the center line extending in a longitudinal direction of the tape and passing through a center of the tape in the lateral direction,
         the first slit row comprises a plurality of slits formed intermittently along the longitudinal direction,
         the second slit row comprises a plurality of slits formed intermittently along the longitudinal direction and parallel to the first slit row,
         a portion without a slit formed in the first slit row does not overlap a portion without a slit formed in the second slit row, and wherein:
the second strength reduction portions includes only a third slit row and a fourth slit row positioned between the third slit row and the center line in the lateral direction,
the third slit row comprises a plurality of slits formed intermittently along the longitudinal direction,
the fourth slit row comprises a plurality of slits formed intermittently along the longitudinal direction and parallel to the third slit row, and
a portion without a slit formed in the third slit row does not overlap a portion without a slit formed in the fourth slit row.

6. The tape according to claim 5, comprising a plurality of the reinforcement portions intermittently provided along the longitudinal direction of the base portion.

\* \* \* \* \*